United States Patent [19]
McCullough

[11] Patent Number: 4,989,385
[45] Date of Patent: Feb. 5, 1991

[54] DEVICE FOR REPAIRING A HOLE IN A PLASTERBOARD WALL

[76] Inventor: Fredrick L. McCullough, 209 N. Division, Cleveland, Okla. 74020

[21] Appl. No.: 457,518

[22] Filed: Dec. 27, 1989

[51] Int. Cl.$^5$ .................. B32B 35/00; E04G 23/02; B29C 73/10; B26D 3/00

[52] U.S. Cl. .................. 52/514; 52/418; 52/420; 52/746; 206/321; 206/813; 264/35; 264/36; 264/273

[58] Field of Search .................. 52/514, 416, 417, 418, 52/420, 746; 264/35, 36, 273; 206/223, 321, 813

[56] References Cited

U.S. PATENT DOCUMENTS

| | | | |
|---|---|---|---|
| 3,874,505 | 4/1975 | Mirarchi | 52/514 X |
| 4,122,222 | 10/1978 | Parker | 52/514 X |
| 4,135,017 | 1/1979 | Hoffman | 52/514 X |
| 4,152,877 | 5/1979 | Green | 52/514 |
| 4,283,240 | 8/1981 | Speer | 264/36 |
| 4,311,656 | 1/1982 | Spriggs | 52/514 X |
| 4,354,332 | 10/1982 | Lentz | 52/514 |
| 4,358,495 | 11/1982 | Parker | 52/514 X |
| 4,370,842 | 2/1983 | Martin | 52/514 |
| 4,460,420 | 7/1984 | Estrada | 52/514 X |
| 4,620,407 | 11/1986 | Schmid | 52/514 X |
| 4,732,633 | 3/1988 | Pokorny | 264/36 |
| 4,759,812 | 7/1988 | Miller | 264/36 |

Primary Examiner—Richard E. Chilcot, Jr.
Assistant Examiner—Deborah McGann Ripley
Attorney, Agent, or Firm—Head and Johnson

[57] ABSTRACT

A device for repairing a hole in a plasterboard wall formed of a flat relatively thin, stiff coverboard, an insulation board secured by adhesive to the coverboard rear surface, the insulation board being dimensioned less than the coverboard leaving a clear space around the peripheral of the coverboard rear surface, the insulation board being dimensioned to be received in the hole to be repaired, and screws or adhesive for securing the coverboard rear surface peripheral clear space to the wall to thereby retain the insulation board in the hole with the coverboard completely covering the hole.

7 Claims, 3 Drawing Sheets

U.S. Patent   Feb. 5, 1991   Sheet 1 of 3   4,989,385
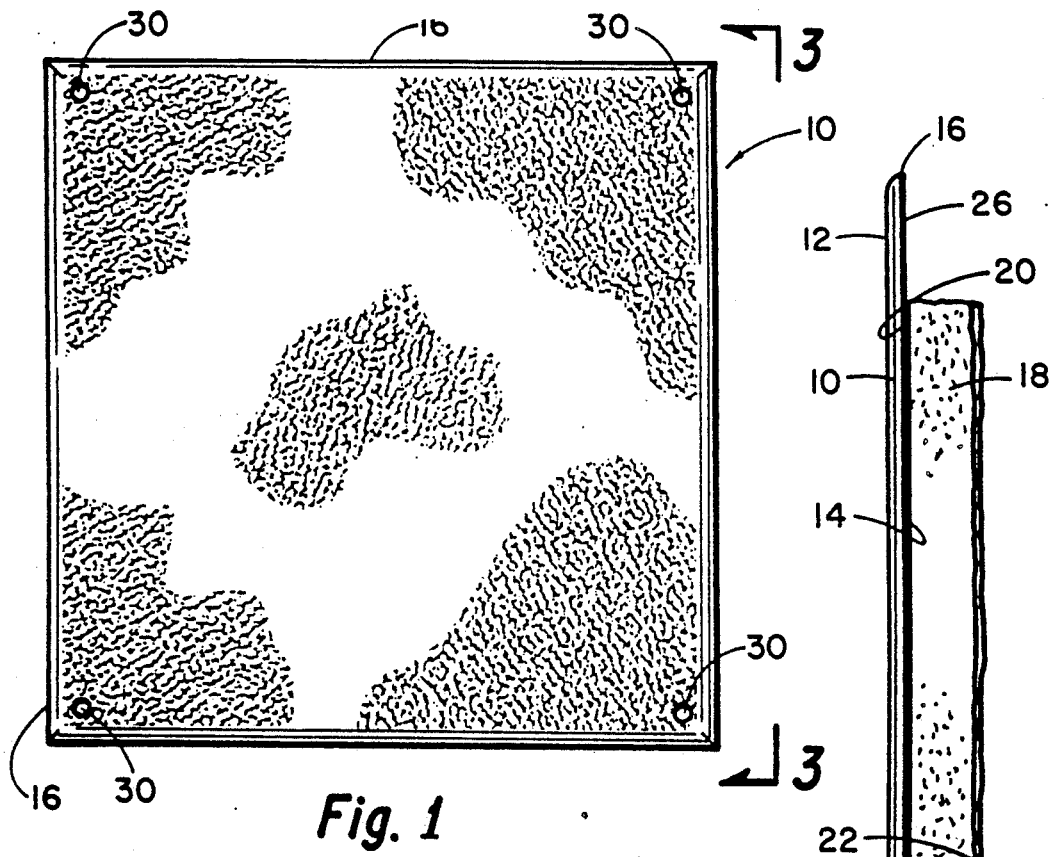
Fig. 1
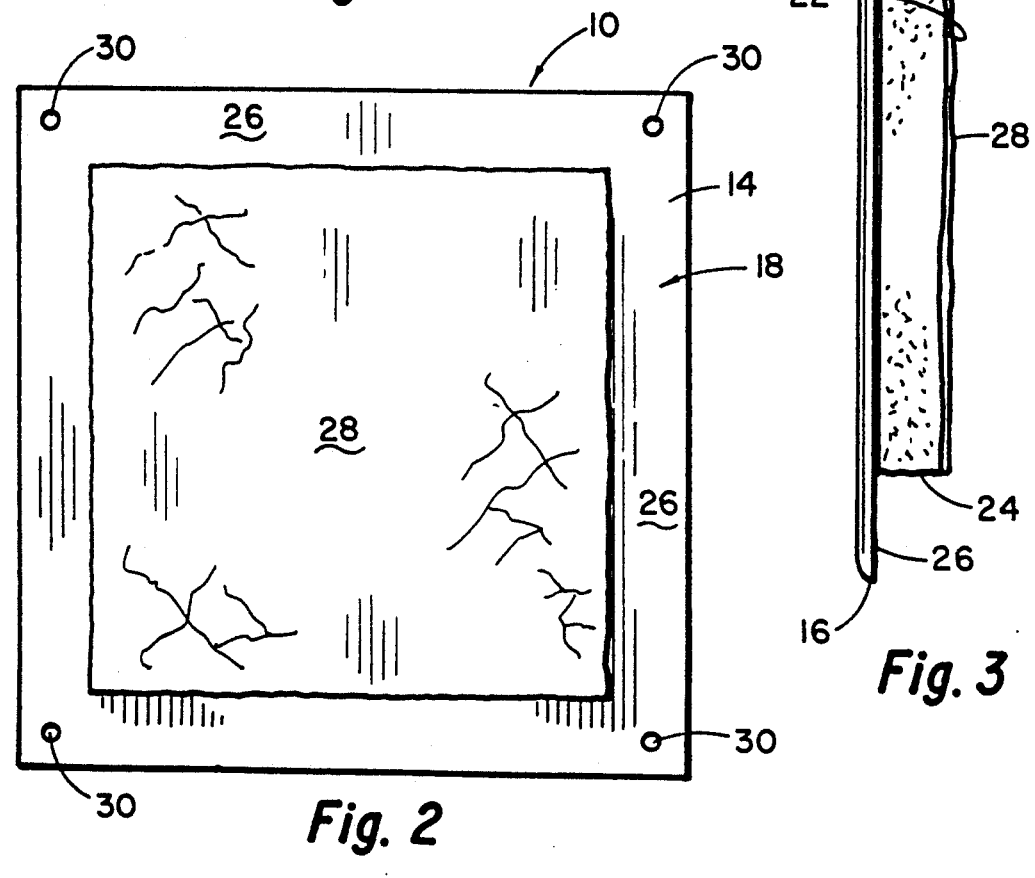
Fig. 2
Fig. 3

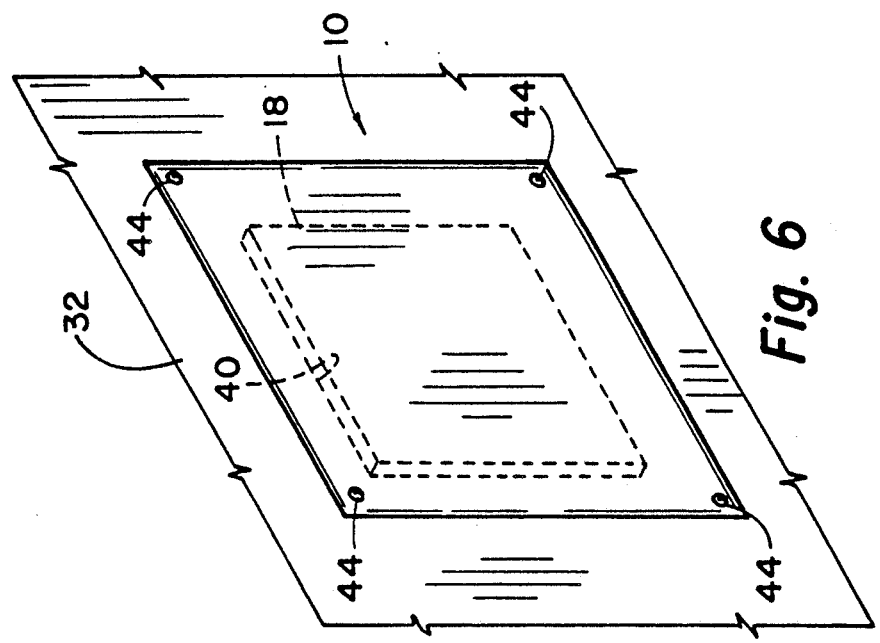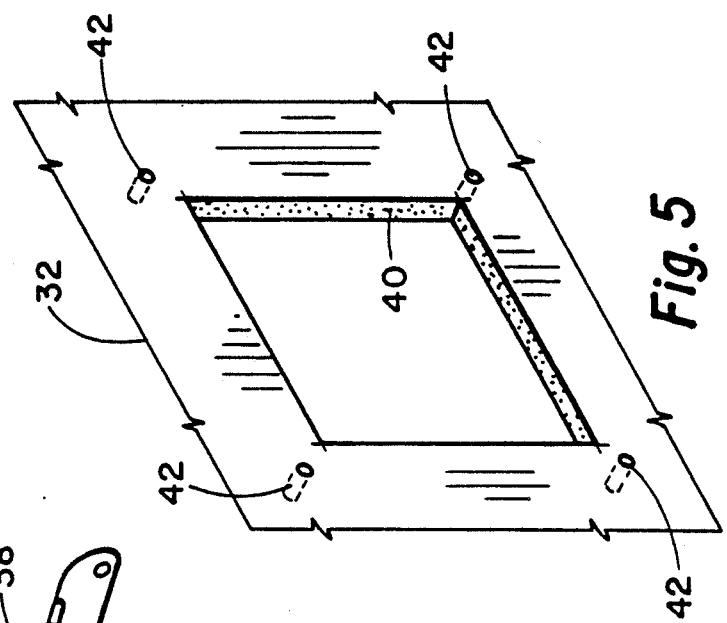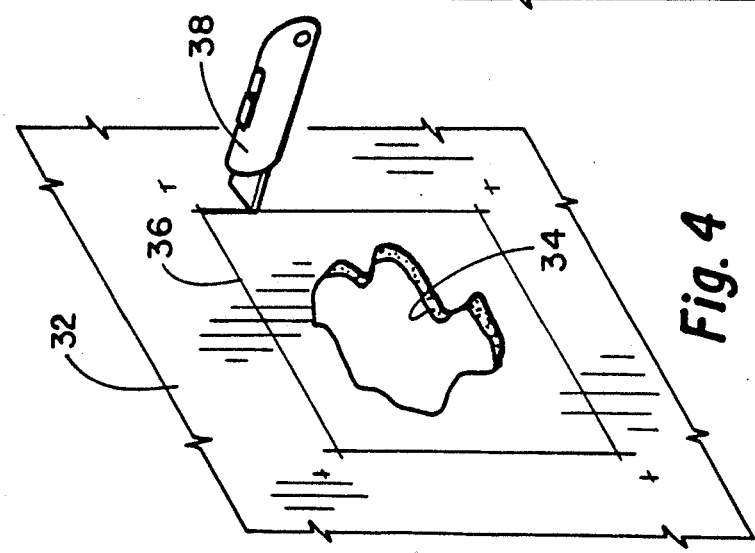

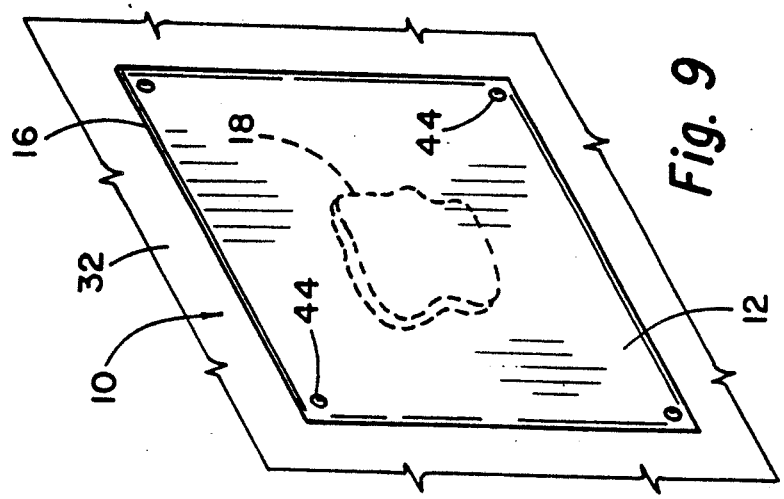
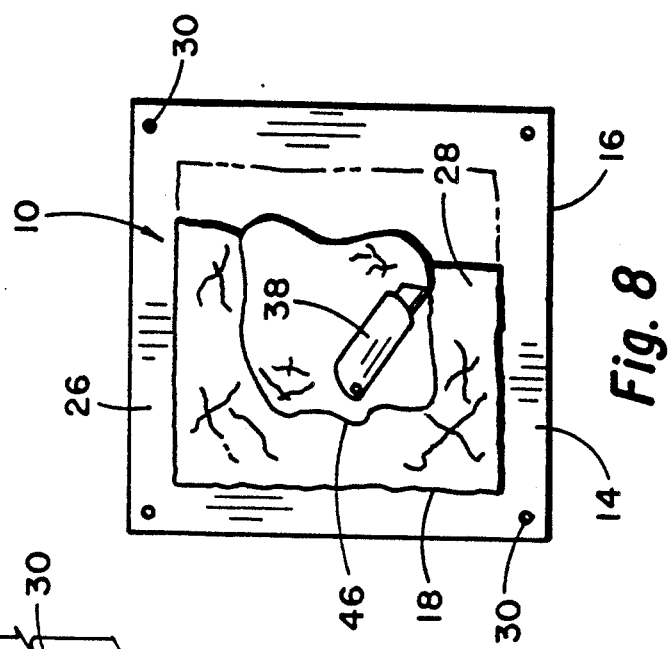
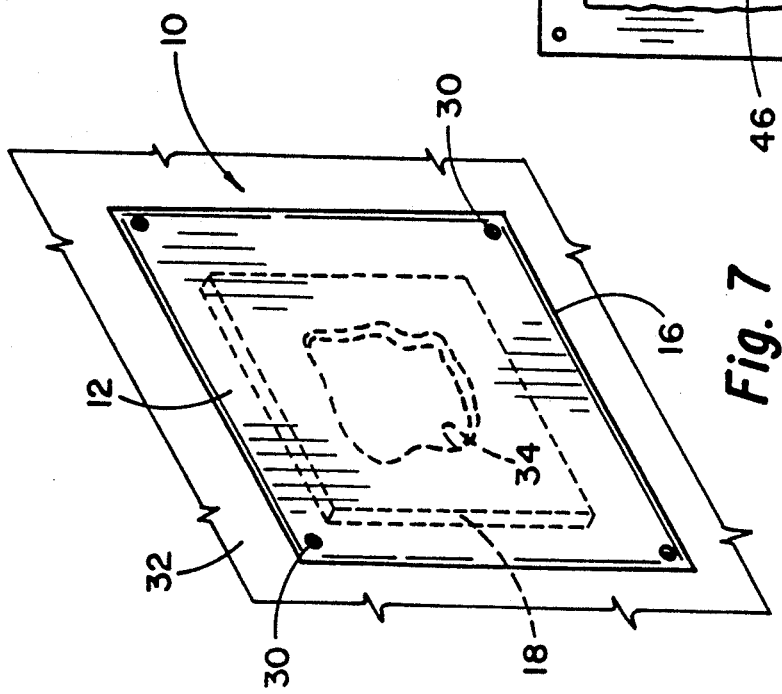

DEVICE FOR REPAIRING A HOLE IN A PLASTERBOARD WALL

SUMMARY OF THE INVENTION

Most homes in the United States today are constructed with walls of 2×4 or 2×6 vertical studs with plasterboard nailed to the studs. The plasterboard is then finished and painted and serves the same purpose as lath and plaster did in the early times. This type of construction is called "drywall."

While plasterboard provides a good wall surface, it, nevertheless, is subject to being damaged. If care is not taken when moving furniture and appliances, a hole can be easily formed in the plasterboard. In addition, when repairing plumping, electrical wiring and so forth, it is frequently necessary to form a hole in the plasterboard.

To atheistically and securely repair a hole in plasterboard is difficult. Ideally, it is necessary to remove the complete plasterboard, and since such boards are typically manufactured in sheets of 4 feet by 8 feet or 4 feet by 10 feet, to remove a complete sheet of plasterboard is time consuming and therefore expensive. Molding used to finish the wall having the plasterboard thereon must first be removed. Due to the expense of removing and replacing a complete sheet of plasterboard, it is a common practice to provide various means of repairing holes in plasterboard. For reference to systems and devices which have been suggested for this purpose, see the following United States Patens which are incorporated herein by reference: 3,874,505; 4,297,823; 4,354,332; 3,996,959; 4,167,196; 485,189; 1,388,485; 2,226,233; 2,824,662 and 4,564,249.

U.S. Pat. No. 3,874,505 is typical of prior known devices which have been employed for repairing holes in plasterboard.

The present disclosure provides a device for efficient and inexpensive repairing of a hole in a plasterboard in a visually pleasing way. The device is formed of a flat, relatively thin, stiff coverboard formed of plastic and having a front surface and a rear surface. The coverers is dimensioned in both length and width to be greater than the hole to be repaired. The coverboard preferable has bevelled edges and may have a plain or textured front surface so as to provide a pleasing appearance after its installation.

Secured to the rear surface of the coverboard is an insulation board. The insulation board may be of the type of material used in building construction, which is typically of about ½ inch thick. The insulation board is typically formed of compressed fibers, such as spun glass, and in the preferred embodiment, the insulation board has a cover on the rearward surface formed of a metal foil, such as aluminum foil. The insulation board is of dimensions in length and width less than that of the coverboard to leave a clear space around the periphery of the coverboard rear surface.

The device may be used in two basic ways. In the first way, the insulation board is used as a pattern to form a boundary on the plasterboard wall around the hole to be repaired. The plasterboard is then cut to enlarge the hole to that which conforms to the shape of the insulation board. The insulation board is typically rectangular, and, therefore, a rectangular hole of dimensions slightly greater than that of the insulation board is formed in the wall to be repaired. Thereafter, the device is placed in position with the insulation board received within the hole in the wall and the substantially conforming to and filling the hole. The coverboard is then attached at its peripheral edges to the wall. This can be done in one of two ways. In one way, adhesive is secured to the rear surface of the coverboard at the peripheral clear space to secure the coverboard to the wall and thereby retain the insulation board in the hole formed in the wall. Another means of mounting is the provision of small diameter openings in the coverboard adjacent the peripheral edges, such as adjacent each corner. Screws can then be inserted through the holes and into the wall to retain the device in position.

In another method of patching a wall utilizing the device of this disclosure, the device with the insulation board having a thin metal foil on the rearward surface thereof is pressed against the wall in the area having the hole therein. The hole forms an outline pattern in the thin metal foil. The insulation board may then be cut away, using a sharp knife, to remove all of the insulation board exterior of the outline of the hole formed in the metal foil. The insulation board is thus dimensioned and sized to fit into the hole. The device is then mounted on the wall with the insulation board received in and substantially conforming to the hole, and the coverboard is mounted to the wall using adhesive or screws, as previously described.

The device can be preferably supplied as a commercial item ready to be used by the homeowner or contractor and in various standard basic dimensions.

A better understanding of the device for repairing a hole in a plasterboard wall and the method of use thereof will be had by reference to the following description and claims, taken in conjunction with the attached drawings.

DESCRIPTION OF THE DRAWINGS

FIG. 1 is front elevational view of a repair device employing the principles of this disclosure.

FIG. 2 is an elevational rear view of the repair device of FIG. 1.

FIG. 3 is an elevational side view as taken along the line 3-3 of FIG. 1, in larger scale.

FIG. 4 is an isometric view of a portion of a plasterboard wall having a hole of irregular shape therein and showing the first step in one method of utilizing the repair device of this disclosure.

FIG. 5 is an isometric view of the wall, as shown in FIG. 4, and showing the hole in the wall being enlarged to a dimension conforming to the insulation board portion of the repair device.

FIG. 6 is an isometric view of a portion of a wall showing the repair device positioned in place on the wall covering the hole therein.

FIGS. 7, 8 and 9 show an alternate method of employing the repair device of this disclose.

FIG. 7 is an isometric view showing a hole in a wall and showing the repair device pushed against the wall so that the hole forms an outline pattern in the metal foil attached to the insulation board.

FIG. 8 is a view of the rear of the repair device showing the outline of the hole formed in the metal foil and showing a portion of the insulation board being cut away in the process of dimensioning the insulation board to fit in the hole.

FIG. 9 is an isometric view showing the repair device positioned on a wall with the insulation board received in and substantially filling the hole in the wall and with the cover board completely covering the hole to provide a pleasing and effective repair of the hole.

DESCRIPTION OF THE PREFERRED EMBODIMENTS

Referring to the drawings and first to FIGs. 1, 2 and 3, a preferred embodiment of the repair device is shown. The device is formed of three basic elements, that is, a coverboard 10 which is a flat, relatively thin, stiff member preferably formed of plastic. The board has a length and width and may be of various dimensions. The embodiment wherein the coverboard 10 is square is illustrated. The coverboard 10 has a front surface 12 and a rear surface 14. The front surface 12 may be plain or with a pattern arrangement as illustrated. While the dimensions may vary, a typical coverboard may be such as 10'×10' or 12'×12' or the like.

As shown in FIGS. 1 and 3, the coverboard has a peripheral edge 16 which is preferably bevelled or rounded so as to form a pleasing appearance when the repair device is used on a wall.

A second basic element of the repair device is an insulation board 18 having a front surface 20 secured to the coverboard rear surface 14 by means of adhesive. The insulation board has a rear surface 22. The insulation board may be of the type typically used as insulation in building construction and may be a board formed of pressed fibers or fiberglass and is preferably selected of material that provides good insulating characteristics. The insulation board is preferably about ½ inch thick, that is, the thickness of the most frequently used sheetrock material.

The insulation board has a peripheral edge 24 and is dimensioned in width and length less than the width and length of the coverboard 10. The reduced dimensions of insulation board 18 provides a clear peripheral area 26 around the coverboard rear surface 14.

The third element making up the repair device is a thin sheet of metal foil 28 which is secured by adhesive to the insulation board rear surface 22. The metal foil 28 is preferably of aluminum and is the type frequently employed as a part of commercially available insulation board.

The coverboard has, adjacent the peripheral edge 16, small diameter openings 30 for receiving screws therethrough as a means of mounting the device to a wall in a manner to be described subsequently.

The repair device of FIGS. 1 through 3 can be used in two basic ways. The first basic method of use is illustrated in FIGS. 4, 5 and 6. In FIG. 4, a portion of a building wall covered by sheetrock is indicated by the numeral 32. The building wall sheetrock 32 has a hole 34 of irregular size, such as has been punched through the sheetrock by engagement with a heavy object, as when a heavy appliance is tilted against the wall during moving or the like. It is the repair of hole 34 in the sheetrock wall 32 to which the repair device of this disclosure is used.

The first step in the use of the device of FIGS. 1, 2 and 3 is to provide an enlarged hole in wall 32, which is slightly larger in dimensions than the dimensions of the insulation board 18. A rectangular pattern 36 is drawn on wall 32 of a dimension substantially equal to and just slightly larger than the insulation board 18, with the pattern completely enveloping hole 34. By means of a knife 38 or a saw, a workman can follow the pattern 36 to provide an enlarged rectangular hole 40 in wall 32, as shown in FIG. 5. In addition, pilot screw holes 42 are drilled in the wall. These screw holes conform in spacing to the holes 30 in the coverboard 10.

The final step of using the repair device to close the unsightly opening in the wall 32 is to attach the device, as shown in FIG. 6, by means of screws 44. The insulation board 18 fits in and substantially fills the rectangular hole 40. The cover 10 can then be painted to match the wall if desired.

In this manner, the wall 32 has been repaired very quickly and economically. If the hole 34 was intentionally formed to provide access to plumping fittings, electrical conductors or the like, the repair device functions to provide a removable opening so that access can be reestablished when necessary.

Instead of using screws 44, the repair device can be mounted on wall 32 by use of adhesive on the coverboard rearward surface peripheral clear area 26 in which case the repair device is permanently secured to the wall.

FIGS. 7, 8 and 9 shown an alternate means of employing the device of this disclosure. In FIG. 7, the repair device is shown pushed against the wall 32 so that the metal foil 28 is pressed against the opening 34. The purpose of the step shown in FIG. 7 is to imprint an outline of the opening 34 onto foil 28. The insulation board 18 is preferably of the type which is compressible—a characteristic common to insulation board made up of pressed fibrous material—so that a relatively small amount of force is required to form an imprint in the metal foil of the outline of the hole 34.

FIG. 8 shows the back of the board with the outline of the hole 34 formed in the metal foil indicated by the number 46. In addition, FIG. 8 shows a portion of the insulation board 18 which is outside of the outline 46 having been cut away. This process is continued until all portions of the insulation board except that within the outline 46 is removed from the back surface of the coverboard 10. Since most insulation board is relatively easy to cut, the removal of the insulation board can be easily accomplished. A sharp knife 38 is used to cut the outline 46, and by use of a putty knife (not shown) the insulation board outside of outline 46 can be removed from the coverboard rear surface 14.

After all of the coverboard has been removed except that within the outline 46, the coverboard is fitted on the wall, as shown in FIG. 6, with the remaining portion of the insulation board extending within opening 34 and closely conforming to it. The coverboard is then mounted to wall 32, such as by means of screws 44 as previously described, or by use of adhesive.

The advantages of the system of FIGs. 7 through 9 is that the hole in the sheetrock wall does not have to be enlarged in order to affect a good repair.

Whether using the system of FIGS. 4 through 6 or that of FIGS. 7 through 9, the repair device provides a system for repairing a wall in which the insulating characteristic of the wall are preserved, and wherein the repair can be accomplished expeditiously and inexpensively without the use of skilled labor or without any special tools.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A device for repairing a hole in a plasterboard wall comprising:
    a flat, relatively thin, stiff coverboard having a front surface and a rear surface;
    a slightly compressible insulation board having a front and back surface and of thickness approximately that of plasterboard, the front surface being secured by adhesive to said coverboard rear surface, said insulation board being dimensioned in length and width less than said coverboard leaving a clear peripheral area on said coverboard rear surface;
    a sheet of impressionable material affixed to said insulation board rear surface whereby said sheet is susceptible to forming an outline when said insulation board is pressed against a wall having a hole therein to provide an outline of the hole on said sheet whereby said insulation board is cut to be slightly less in dimension than a hole in the wall to be repaired whereby said insulation board in receivable in and substantially fills the hole in the wall to be repaired; and,
    means to secure peripheral clear space of said coverboard rear surface to a wall to be repaired to thereby retain said insulation board in the hole and said coverboard completely covering the hole.

2. A wall repair device according to claim 1 wherein said coverboard has spaced apart holes therein in said clear peripheral area and wherein said means to secure said coverboard to a wall to be repaired includes the use of a screw for each of said holes.

3. A wall repair device according to claim 1 wherein the edges of said coverboard front surface at the periphery thereof are bevelled.

4. A wall repair device according to claim 1 wherein said sheet of impressionable material affixed to said insulation board rear surface is a metal foil.

5. A method of repairing a hole in a drywall plasterboard wall comprising:
    providing a repair device having a flat, relatively thin, stiff coverboard and having a front and a rear surface and having an insulation board having a front and rear surface, the front surface of the insulation board being secured by adhesive to said coverboard rear surface, the insulation board being dimensioned in length and width greater than said hole and less than said coverboard, and a sheet of impressionable material affixed to said insulation board rear surface;
    pressing said coverboard and insulation board against the surface of the wall to be repaired to form an imprint of the hole therein in said impressionable sheet;
    cutting away the insulation board exterior of the imprint formed in the sheet to leave insulation board affixed to the coverboard of dimension and shape substantially conforming to that of the hole; and
    securing the coverboard to the wall with the insulation board inserted into and substantially filling the hole.

6. The method of claim 5 wherein said coverboard has a plurality of spaced apart small diameter openings therein adjacent the periphery thereof and wherein said step of securing the coverboard to the wall includes threadably inserting screws through said openings and into the wall.

7. A wall repair device according to claim 1 wherein said insulation board is of material which is shapeable such as by use of a hand-held knife whereby said insulation board may be configured to be closely received in a hole in a plasterboard wall.

* * * * *